(12) United States Patent
Savage et al.

(10) Patent No.: US 7,799,473 B2
(45) Date of Patent: Sep. 21, 2010

(54) ANODE RECIRCULATION FOR A PARALLEL DUAL STACK FUEL CELL SYSTEM

(75) Inventors: David R. Savage, Penfield, NY (US); John P. Salvador, Penfield, NY (US); Jon R. Sienkowski, Rochester, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 937 days.

(21) Appl. No.: 11/645,847

(22) Filed: Dec. 27, 2006

(65) Prior Publication Data

US 2008/0160353 A1   Jul. 3, 2008

(51) Int. Cl.
H01M 8/04 (2006.01)
H01M 8/06 (2006.01)

(52) U.S. Cl. .................... 429/415; 429/410; 429/513

(58) Field of Classification Search .................. None
See application file for complete search history.

(56) References Cited

U.S. PATENT DOCUMENTS 5,518,828 A * 5/1996 Senetar .................... 429/26
6,344,289 B2 * 2/2002 Dekker et al. .............. 429/17
7,169,491 B2 * 1/2007 Schafer ...................... 429/17

FOREIGN PATENT DOCUMENTS

CN    1635657 A    7/2005

\* cited by examiner

*Primary Examiner*—John S Maples
(74) *Attorney, Agent, or Firm*—Fraser Clemens; Martin & Miller LLC; J. Douglas Miller

(57) ABSTRACT

A parallel dual stack fuel cell system having anode recirculation includes a first fuel cell stack and a second fuel cell stack. Each of the first and second fuel cell stacks includes a gas outlet line connected to an anode outlet unit. The anode outlet unit functions to release wet $H_2/N_2$ gaseous mixture from the system. A second water separator is provided between the anode outlet unit and gas inlet lines to the first and second fuel cell stacks to increase removal of water droplets prior to a recirculation pump.

20 Claims, 1 Drawing Sheet

ANODE RECIRCULATION FOR A PARALLEL DUAL STACK FUEL CELL SYSTEM

FIELD OF THE INVENTION

This invention relates to a fuel cell system. More particularly, the invention relates to a dual stack fuel cell system and to anode recirculation for a parallel dual stack fuel cell system.

BACKGROUND OF THE INVENTION

The fuel cell is generally seen as an alternative to known power technologies. PEM (Proton Exchange Membrane) fuel cells, commonly referred to as PEM Fuel Cells, generate low emissions and work at a high level of efficiency. Basically, the fuel cell converts chemical energy into electrical energy. More particularly, the fuel cell used today comprises one cathode area and one anode area. The anode is separated from the cathode by a solid polymer electrolyte membrane. Electricity is generated by a fuel cell stack by way of an electrochemical reaction between hydrogen and oxygen. Specifically, a hydrogen-rich gas is supplied to the anode side of the fuel cell. An oxygen-containing oxidant (typically atmospheric oxygen) is supplied to the cathode of the fuel cell. The hydrogen molecules on the anode side react according to the following equation: $H_2 \rightarrow 2.H^+ + 2.e^-$. As a result of this reaction positively-charged hydrogen ions are formed. Electrons are lost to the electrode. The $H^+$ ions are conducted through the electrolyte to the cathode. At the cathode the $H^+$ ions react with the atmospheric oxygen $O_2$ and the electrons $e^-$ to form water by way of the following equation: $0.5.O_2 + 2.H^+ + 2.e^- \rightarrow H_2O$.

For all of their technical achievements, current fuel cell arrangements are known to suffer from the accumulation of liquid water on the anode side as well. Liquid water on the anode side can facilitate cathode catalyst degradation which lowers stack voltage and consequently the stack life.

SUMMARY OF THE INVENTION

According to the present invention, an improvement over known fuel cell arrangements is achieved by providing a system that will increase the anode velocity within the stack channels.

The system of the present invention includes a parallel dual stack system including a first fuel cell stack and a second fuel cell stack. Each of the first and second fuel cell stacks includes a gas line connected to an anode outlet unit. The anode outlet unit functions to release wet $H_2/N_2$ gaseous mixture from the system. A second water separator can be provided between the anode outlet unit and the return lines to the first and second fuel cell stacks to increase removal of water droplets prior to a recirculation pump. Alternatively, variable orifices may be provided on the return lines for balancing the flows to the dual stacks.

By implementing anode recirculation according to the present invention the gas velocities in the channels of the plates will be sufficient to push any liquid water slugs through the channels and to the system outlet. The present invention includes the elements needed to supply the hydrogen gas, to control the liquid water, to control the temperature of the stream, and to control the stream composition entering the stacks.

The return gas from the stacks enters the anode outlet unit which has a water separator, a bleed valve, a purge valve, and drain valve incorporated into one unit. If requested the bleed valve will open to bleed the wet $H_2/N_2$ gaseous mixture from the anode loop. The bleed valve is opened whenever the dry gas concentration reaches between 50% and 90% $H_2$ and between 50% and 10% $N_2$. This concentration can be determined by a model or sensor. The drain valve opens whenever water accumulates in the anode outlet unit and reaches a level that triggers the built-in level switch. At shutdown, it may be desirable to have the purge valve open to relieve pressure in the system. It may be further desirable to have the gaseous mixture enter a separator for additional water removal.

The gas then enters the inlet of the pump. It may be desirable to inject a stream of $H_2$ into the pump for cooling the motor, as well as for mixing with the gaseous stream. The gas is compressed in the pump. Additionally, the pump can be cooled by alternative means, such as air or liquid, without departing from the scope of this invention.

Hydrogen gas is injected into a mixer/heater exchanger where it is mixed with the compressed gas and is heated to the stack outlet temperature by the stack coolant loop which is pumped through the mixer/heater.

The gas is then split into two lines, supplying each of the first and second fuel cell stacks. It is desirable that the first and second fuel cell stack pathways have similar pressure drops. Additionally, variable orifices or linear pressure drop elements may be installed in each line to allow for flow balancing based on stack performance during the initial operation of the module.

The gas then flows through the stack, counterflow to the cathode and coolant flows, where $H_2$ is consumed, and $N_2$ crosses over from the cathode side of the unitized electrode assembly. Water vapor also migrates from the cathode side of the unitized electrode assembly.

Other advantages and features of the invention will become apparent when viewed in light of the detailed description of the preferred embodiment when taken in conjunction with the attached drawing and the appended claims.

DESCRIPTION OF THE DRAWINGS

The above, as well as other advantages of the present invention, will become readily apparent to those skilled in the art from the following detailed description of a preferred embodiment when considered in the light of the accompanying drawing in which.

DESCRIPTION OF THE PREFERRED EMBODIMENT

Figure 1:
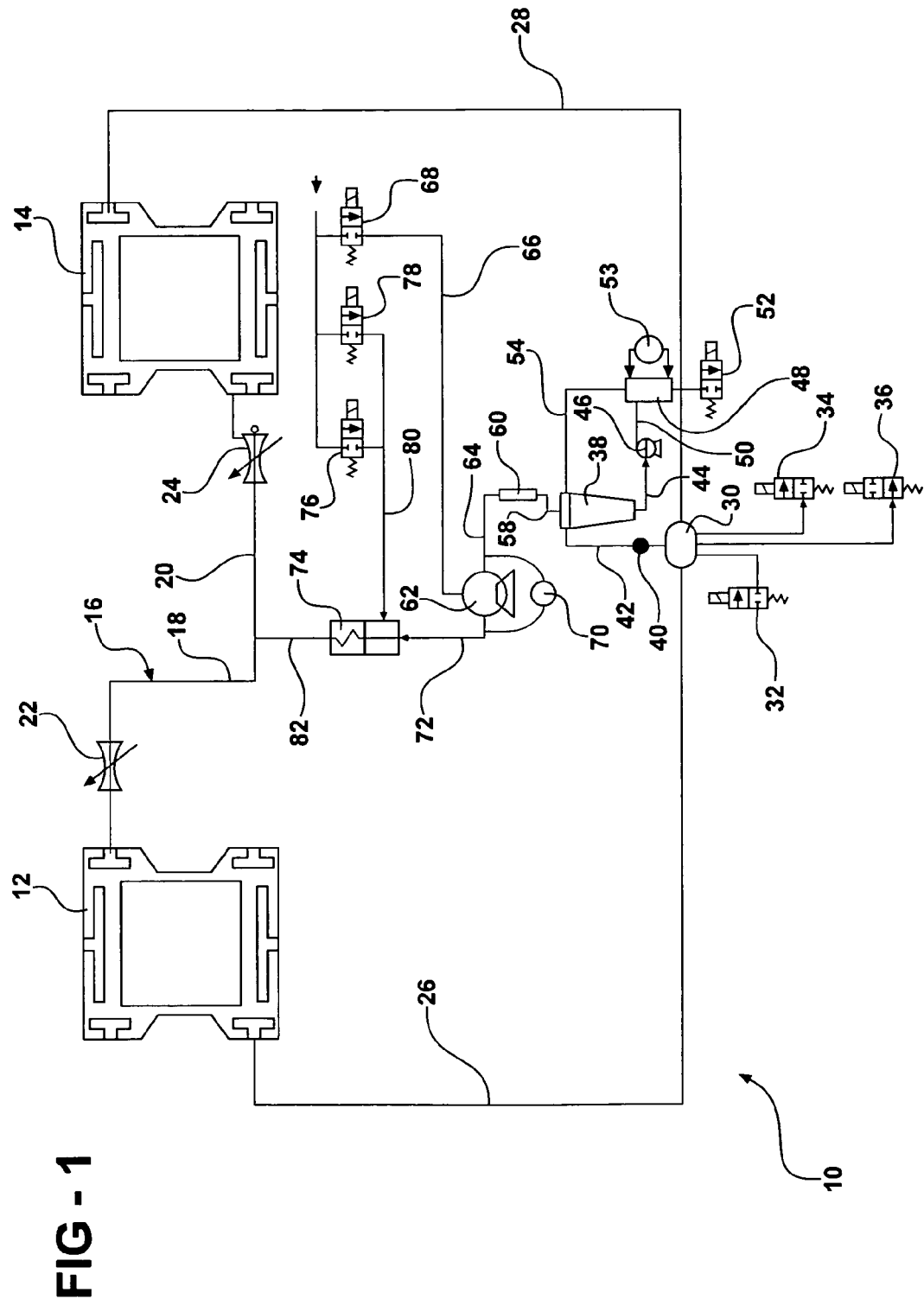
FIG. 1 is a schematic diagram of a parallel dual stack fuel cell system according to an embodiment of the invention.

The following detailed description and appended drawing describe and illustrate various exemplary embodiments of the invention. The description and drawing serve to enable one skilled in the art to make and use the invention, and are not intended to limit the scope of the invention in any manner. In respect of the methods disclosed, the steps presented are exemplary in nature, and thus, the order of the steps is not necessary or critical.

With reference to FIG. 1, a parallel dual stack fuel system with an anode recirculation loop is shown and is generally illustrated as 10. The system 10 includes a first fuel cell stack 12 and a second fuel cell stack 14.

A series of gas lines are provided to enable the flow of gas through the recirculation system of the present invention. The gas lines may be provided with insulation to minimize condensing. There is provided a common gas inlet line 16 which delivers dried gas to the anode sides of both the first fuel cell stack 12 and to the second fuel cell stack 14. The line 16 is divided into a first stack inlet line 18 and a second stack inlet line 20. A first variable orifice 22 is fitted to the first stack inlet line 18 and a second variable orifice 24 is fitted to the second stack inlet line 20. The variable orifices 22, 24 serve to allow automatic adjustment of gas flow if required for optimum operation of the system 10.

A first gas outlet line 26 and a second gas outlet line 28 are provided to deliver return gas from the anode side of the first fuel cell stack 12 and from the anode side of the second fuel cell stack 14 respectively to an anode outlet unit 30. The anode outlet unit 30 functions as a water separator to separate out the liquid $H_2O$ from the gaseous mixture generated by the anode sides of the first fuel cell stack 12 and the second fuel cell stack 14. The anode outlet unit 30 includes a bleed valve 32, a purge valve 34, and a drain valve 36.

The bleed valve 32 functions to bleed the wet $H_2/N_2$ gas in the anode outlet unit 30 to decrease the concentration of N2 in the recirculation loop. The bleed valve 32 is opened whenever the dry gas concentration reaches a specific ratio of $H_2$ to $N_2$. Favorable results have been obtained with a ratio of 80% $H_2$ and 20% $N_2$, although the range of gases may be between 50% and 90% $H_2$ and between 50% and 10% $N_2$.

The purge valve 34 may be opened to relieve pressure to the system 10. This occurs when the system 10 is started up and is shut down.

The drain valve 36 functions to release liquid water from the anode outlet unit 30. The drain valve 36 opens to release the liquid water whenever the volume of accumulated water reaches a preferred level.

It may be that additional water should be removed from the de-wetted gas exiting the anode outlet unit 30 on its way to the anode sides of the first fuel cell stack 12 and the second fuel cell stack 14. Accordingly, a second water separator 38 may be fitted to the system 10. An anode outlet pressure sensor 40 is fitted to a line 42 between the anode outlet unit 30 and the separator 38 to monitor and react to the pressure of the gas exiting the anode outlet unit 30.

The gas passing out of the separator 38 is delivered into a pump 62 by way of a delivery line 64. A stream of atmospheric $H_2$ gas is injected into the pump 62 by way of an $H_2$ pump injection 66 line which is connected to a pressure controller/injector 68. The injected $H_2$ serves a dual role. First, the injected $H_2$ mixes with the passing gaseous stream. Second, the injected $H_2$ provides a coolant to cool the motor of the pump 62. Alternatively, the $H_2$ can be injected downstream of the pump if motor cooling is provided by different means. The pump 62 compresses the mixed gas.

A pump differential pressure sensor 70 is connected to the $H_2$ pump injection line 64 and to a pump outlet line 72. The differential sensor 70 monitors and responds to the pressure differential between gas entering the pump 62 and the gas exiting the pump 62.

The mixed gas compressed by the pump 62 is directed to a mixer/heat exchanger 74 via the pump outlet line 72. The entering compressed gas is mixed with additional $H_2$ which is injected into the mixer/heat exchanger 74 from pressure controllers/injectors 76, 78 by way of an injector line 80. The mixture of entering compressed gas and injected $H_2$ is heated in the mixer/heat exchanger 74 to between about 60° C. and 80° C. which is the approximate operating temperature of the first fuel cell stack 12 and the second fuel cell stack 14. In an alternate embodiment, if the mixed stream is hotter than desired, the heat exchanger can be used to cool the stream to the desired operating temperature.

The heated and mixed gas exits the mixer/heat exchanger 74 via a line 82 which is connected to the common gas inlet line 16. Accordingly, the heated and mixed gas leaving the mixer/heat exchanger 74 is split between the first stack inlet line 18 and the second stack inlet line 20. The variable orifices 22, 24 on the lines 18, 20 respectively could allow for flow balancing based upon the performance of the first fuel cell stack 12 and the second fuel cell stack 14 during the initial operation of the system operating module (not shown). It should be noted that while variable orifices 22, 24 are shown, it may be possible to substitute these variable units with fixed orifices based upon experimental data. Alternatively, linear flow elements could be used instead of orifices.

In the embodiment shown, the mixed and heated gas enters each of the first fuel cell stack 12 and the second fuel cell stack 14 in a direction counterflow to the cathode and coolant flows where $H_2$ is consumed and where $N_2$ crosses over from the cathode side of the unitized electrode assembly as is known in the art. It is understood that other flow types can be used such as co-flow, for example. Water vapor also migrates from the cathode side of the unitized electrode assembly.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A parallel dual stack fuel cell including an anode recirculation system, the parallel dual stack fuel cell comprising:
    a first fuel cell stack;
    a second fuel cell stack;
    an anode outlet unit;
    a gas inlet line connected with said anode outlet unit and with each of said first and second fuel cell stacks; and
    a gas return means connected with each of said first and second fuel cell stacks and with said anode outlet unit.

2. The parallel dual stack fuel cell of claim 1 wherein said anode outlet unit operates to release accumulated water from return gas received from said first and second fuel cell stacks via said gas return means.

3. The parallel dual stack fuel cell of claim 2 wherein anode outlet unit operates to release the accumulated water when the return gas has a concentration ratio of between about 50% $H_2$ and 90% $H_2$ and between about 50% $N_2$ and 10% $N_2$.

4. The parallel dual stack fuel cell of claim 1 wherein said anode outlet unit includes a purge valve, said purge valve being selectively opened during shutdown to relieve pressure in the system.

5. The parallel dual stack fuel cell of claim 1 wherein the anode outlet unit includes a drain valve, said drain valve being opened whenever a predetermined amount of the water accumulates in said anode outlet unit.

6. The parallel dual stack fuel cell of claim 1 wherein said anode outlet unit includes a water separator.

7. The parallel dual stack fuel cell of claim 6 wherein said parallel dual stack fuel cell system further includes another separator for additional water removal, said another separator being connected between said anode outlet unit and said gas inlet line.

8. The parallel dual stack fuel cell of claim 1 further including a pump disposed between said anode outlet unit and said gas inlet line and wherein a stream of $H_2$ is injected into said pump for cooling a motor of said pump.

9. The parallel dual stack fuel cell of claim 1 further including cooling a motor in said pump by at least one of air and liquid coolant.

10. The parallel dual stack fuel cell of claim 1 including an $H_2$ injector line connected with said gas inlet line for selectively injecting $H_2$ into a gaseous stream flowing from said anode outlet unit to said first and second fuel cell stacks.

11. A parallel dual stack fuel cell including an anode recirculation system, the parallel dual stack fuel cell comprising:
- a first fuel cell stack;
- a second fuel cell stack;
- an anode outlet unit, said anode outlet unit having a water separator, a bleed valve, a purge valve, and a drain valve;
- a gas inlet line connected with said anode outlet unit and with each of said first and second fuel cell stacks;
- a first gas outlet line connected with said first fuel cell stack and with said anode outlet unit; and
- a second gas outlet line connected with said second fuel cell stack and with said anode outlet unit,
- whereby said anode outlet unit is selectively operable to allow the release of wet $H_2/N_2$ gaseous mixture from return gas delivered by said first and second gas return lines.

12. The parallel dual stack fuel cell of claim 11 wherein said anode outlet unit releases accumulated water in response to a concentration ratio of $H_2$ and $N_2$ with the $H_2$ between about 50% and 90% and the $N_2$ between about 50% and 10%.

13. The parallel dual stack fuel cell of claim 11 including another separator for additional water removal, said another separator being connected between said anode outlet unit and said gas inlet line.

14. The parallel dual stack fuel cell of claim 11 including a pump disposed between said anode outlet unit and said gas inlet line and wherein a stream of $H_2$ is injected into said pump for cooling a motor of said pump.

15. The parallel dual stack fuel cell of claim 11 including an $H_2$ inlet line connected with said gas inlet line for selectively injecting $H_2$ into the gaseous stream flowing from said anode outlet unit to said first and second fuel cell stacks.

16. A method of removing accumulated water from the anode side of a parallel dual stack fuel cell, the method comprising the steps of:
- forming a parallel dual stack fuel cell system comprising a first fuel cell stack, a second fuel cell stack, an anode outlet unit having a water separator and a bleed valve, a gas inlet line connected with said anode outlet unit and with each of said first and second fuel cell stacks, a first gas outlet line connected with said first fuel cell stack and with said anode outlet unit, and a second gas outlet line connected with said second fuel cell stack and with said anode outlet unit;
- opening the bleed valve of the anode outlet unit to bleed wet $H_2/N_2$ when a dry gas concentration of gas delivered to the anode outlet unit via the first and second gas outlet lines reaches a predetermined ratio of $H_2$ to $N_2$; and
- bleeding the wet $H_2/N_2$ from the anode outlet unit through the bleed valve.

17. The method of claim 16 wherein said predetermined ratio is between about 50% $H_2$ and 90% $H_2$ and between about 50% $N_2$ and 10% $N_2$.

18. The method of claim 16 wherein the anode outlet unit includes a drain valve and including a step of opening the drain valve whenever a predetermined amount of water accumulates in said anode outlet unit.

19. The method of claim 16 including a step of providing another separator for additional water removal and operating the another separator to remove water from gas flowing from the anode outlet unit to the gas inlet line.

20. The method of claim 16 including a step of injecting a stream of $H_2$ into at least one of a pump connected between the anode outlet unit and the gas inlet line and a gaseous stream flowing from the anode outlet unit to the first and second fuel cell stacks.

* * * * *